United States Patent
Chu et al.

(10) Patent No.: US 9,124,567 B2
(45) Date of Patent: Sep. 1, 2015

(54) METHODS AND DEVICES FOR CONVERTING ROUTING DATA FROM ONE PROTOCOL TO ANOTHER IN A VIRTUAL PRIVATE NETWORK

(75) Inventors: Thomas P. Chu, Englishtown, NJ (US); Francis R. Magee, Lincroft, NJ (US); Steven H. Richman, Marlboro, NJ (US)

(73) Assignee: ALCATEL LUCENT, Paris (FR)

( * ) Notice: Subject to any disclaimer, the term of this patent is extended or adjusted under 35 U.S.C. 154(b) by 171 days.

(21) Appl. No.: 13/342,637

(22) Filed: Jan. 3, 2012

(65) Prior Publication Data

US 2012/0140772 A1 Jun. 7, 2012

Related U.S. Application Data

(63) Continuation of application No. 10/252,815, filed on Sep. 24, 2002, now abandoned.

(51) Int. Cl.
*H04L 29/06* (2006.01)
(52) U.S. Cl.
CPC ..................... *H04L 69/08* (2013.01)

(58) Field of Classification Search
None
See application file for complete search history.

(56) References Cited

U.S. PATENT DOCUMENTS

| | | | |
|---|---|---|---|
| 5,717,737 A * | 2/1998 | Doviak et al. | 455/403 |
| 6,438,612 B1 * | 8/2002 | Ylonen et al. | 709/249 |
| 2002/0037010 A1 * | 3/2002 | Yamauchi | 370/395.53 |
| 2002/0184388 A1 * | 12/2002 | Yaseen et al. | 709/242 |
| 2004/0202171 A1 * | 10/2004 | Hama | 370/395.1 |

OTHER PUBLICATIONS

Rosen, E. et al, RFC:2547 BGP/MPLS VPNs, Mar. 1999, The Internet Society. pp. 8-14.*

* cited by examiner

*Primary Examiner* — Huy D Vu
*Assistant Examiner* — Bao G Nguyen
(74) *Attorney, Agent, or Firm* — Capitol Patent & Trademark Law Firm, PLLC

(57) ABSTRACT

Data (e.g., instructions) used to route Internet Protocol traffic is converted from one protocol to another (e.g., MPLS to Virtual Router) or vice-versa. This allows routers and other network devices based on either protocol to co-exist in the same network.

5 Claims, 11 Drawing Sheets

|  | HQ | Data Center | Eng. | Factory 1 | Factory 2 | Market-ing | Sales 1 | Sales 2 |
|---|---|---|---|---|---|---|---|---|
| HQ | 1 | 1 | 1 | 1 | 1 | 1 | 1 | 1 |
| Data Center | 1 | 1 |  |  |  |  |  |  |
| Eng. | 1 |  | 1 | 1 | 1 |  |  |  |
| Factory 1 | 1 |  | 1 | 1 | 1 |  |  |  |
| Factory 2 | 1 |  | 1 | 1 | 1 |  |  |  |
| Market-ing | 1 |  |  |  |  | 1 | 1 | 1 |
| Sales 1 | 1 |  |  |  |  | 1 | 1 | 1 |
| Sales 2 | 1 |  |  |  |  | 1 | 1 | 1 |

*FIG. 5*

|  | Data Ctr 10 | Data Ctr 20 | Data Ctr 30 | Branch 40 | Branch 50 | Branch 60 | Branch 70 | Branch 80 |
|---|---|---|---|---|---|---|---|---|
| Data Ctr 10 |  |  |  |  |  |  |  |  |
| Data Ctr 20 |  |  |  |  |  |  |  |  |
| Data Ctr 30 |  |  |  | 1 | 1 | 1 | 1 | 1 |
| Branch 40 |  | 1 |  |  |  |  |  |  |
| Branch 50 |  | 1 |  |  |  |  |  |  |
| Branch 60 |  | 1 |  |  |  |  |  |  |
| Branch 70 |  | 1 |  |  |  |  |  |  |
| Branch 80 |  | 1 |  |  |  |  |  |  |

*FIG. 7*

| Resulting MPLS Routing Data | Obtaining from (VR Routing Data) |
| --- | --- |
| NEXT_HOP field | PE router IP address |
| MPLS label | Customer site ID |
| RD | Input by user for each customer site |
| RT | VR-ID |
| NLRI | Customer Location IP Subnet Address |

FIG. 10

| Resulting VR Routing Data | Obtaining from MPLS Routing Data |
|---|---|
| IP address of PE router | From NEXT_HOP field |
| Customer site ID | MPLS label |
| VR-ID | From RT to VPN table |
| VPN-customer ID | From RT to VPN Table |
| Customer Location IP subnet address | NLRI fields of MPLS BGP message |
| Additional IP subnets address | Special processing for identied network |

*FIG. 11*

METHODS AND DEVICES FOR CONVERTING ROUTING DATA FROM ONE PROTOCOL TO ANOTHER IN A VIRTUAL PRIVATE NETWORK

CROSS-REFERENCE TO RELATED APPLICATIONS

This application is a continuation of U.S. patent application Ser. No. 10/252,815, filed on Sep. 24, 2002, the disclosure of which is incorporated in full herein as if set forth in full herein.

BACKGROUND OF THE INVENTION

Historically, when a company or any other group of people needed to have their computers and the like "networked" together they would contact a local telephone company or another so-called "service provider" ("SP") to assist them. The service provider would design and construct a network using so-called "connection-oriented" technology (e.g., some combination of leased "private lines" and the publicly switched telephone network, dial-up lines or the like).

As is known by those skilled in the art, networks designed using existing connection-oriented technologies have their drawbacks.

In order to overcome the drawbacks inherent in existing network designs, SP based, Internet-protocol ("IP") virtual private networks ("VPNs") have been developed ("IP-VPNs" for short). IP-VPNs are designed using "connectionless" technology. One of the advantages a connectionless network has over a connection-oriented network is that there is no need for an administrator or the like of a network to specify traffic characteristics between two sites or locations (hereafter collectively referred to as "location(s)") in a network. Instead, it is now up to the SP to deliver communication services that are associated with a certain "Quality of Service" ("QoS") level.

This allows an SP to manage all of the traffic flowing from each of its customers as an aggregate, resulting in increased efficiencies in both network resource usage and network management.

Two common techniques used to create an SP based, IP-VPN are Multi-Protocol Label Switching ("MPLS") and "virtual routers" ("VR"). It should be understood that both techniques are used to implement VPNs. The MPLS approach is articulated in an Internet protocol proposal Request for Comment ("RFC") 2547 (RFC 2547) entitled "*BGP/MPLS VPN'S*" (as well as in internet draft-rfc2547bis, its second version). The VR approach is in actuality, a family of techniques. There are a number of possible ways to implement a VR-based, VPN. One implementation is articulated in Internet RFC 2917 entitled "*A Core MPLS IP VPN Architecture*".

Overly simplified, the difference between an MPLS-VPN and a VR-VPN is that the former uses so-called route distinguishers (RDs) and route targets (RTs) to route communications traffic (e.g., data) from one location in a network to another, while the latter uses so-called "access lists" to accomplish the same thing.

Before discussing the details of the present invention, it may be helpful to introduce some terms which will be used repeatedly throughout the discussion below.

In RFC 2547 (i.e., MPLS-based techniques), an LP network is divided into two tiers, a core network that consists of "core routers", and edge networks that consist of "service provider edge" ("PE") routers. Customer routers are in turn connected to the PE routers. The customer routers that are directly attached to the PE routers are referred to as "customer edge" ("CE") routers. All VPN functions are implemented in the PE routers. Core routers are operable to forward MPLS "packets", (e.g., small bits of data) but they are not assigned VPN tasks. Similarly, CE routers behave as if they are connected to ordinary routers, (e.g., they do not receive information telling them that PE routers are RFC 2547 compliant).

In RFC 2547, a customer location is connected to a PE router through a CE router and the connection is identified via a layer 1 or a layer 2 identifier that can represent: a physical interface ID; a virtual path/virtual circuit identifier of an ATM interface ("ATM" stands for Asynchronous Transfer Mode); a data link connection identifier of a frame relay interface; a virtual local area network identifier of an Ethernet serial link interface; and/or the MPLS label of a MPLS interface. One or more of these interfaces will be referred to hereafter as a "pathway".

A basic requirement for a VPN is that each IP-VPN subscriber must be able to use its own private IP addressing scheme. Therefore, each PE router needs to be able to route IP packets based on differing incoming data streams. In theory, this may require a different decision process for each data stream. There are two possible approaches which can be used by a PE router. The first is to create a "routing/forwarding table" for each VPN. The second is to create a single routing/forwarding table with "context" for each VPN. In RFC 2547, the first approach is considered resource and management intensive, so the second approach is utilized.

Routing tables are stored within each PE router. It is the routing tables that contain the instructions, guidelines and the like which tells the PE router how to treat each received data stream. That is to say, each routing table provides directions, for example, on how to handle an incoming data stream, where to route it next, if any action should be taken at all, etc. . . . . .

The context specific table for each VPN is referred to as a VPN Routing and Forwarding ("VRF") table. Each VRF table is identified by a parameter known as a Route Distinguisher ("RD"). For the sake of efficiency, multiple data streams from different pathways can point to the same VRF. An RD contains two fields that identify the SP and the routing domain within the SP's network. RD assignment is the responsibility of the SP.

To create such VRF tables manually is cost prohibitive and not scaleable. Therefore, a "routing protocol" between PE routers is used to automatically update and synchronize the content of the VRF tables each time locations in the network are added, deleted or modified. In RFC 2547, the routing protocol used is a Border Gateway Protocol with Multi-Protocol Extensions ("BGP-MP"), as specified in RFC 2858 from the Internet Engineering Task Force.

The BGP-MP routing protocol specifies a number of parameters, one of which is called a Route Target ("RT"). A PE uses RTs to "advertise" its routes to other PEs that are considered its "peers". RTs are used to describe the VPN (or "VPN" component) that the route is applicable to. Because a location may belong to multiple VPNs or VPN components, multiple RTs can be associated with a single route.

Both RDs and RTs are known as network wide parameters because they have to be unique across the entire network. To ensure that a VPN is working properly, RDs and RTs must be properly generated and assigned. If the incorrect RT is assigned it may be impossible for one or more PE routers to correctly route packets of data. Furthermore, if RDs are efficiently assigned the number of VRFs in a PE can be reduced, thereby allowing network resources to be conserved. Further still, with efficient RT assignment, it would be unnecessary to reconfigure existing PE routers each time a new location is added resulting in a considerable savings in network management.

RD and RT assignments will change over time because: (1) the networks they are associated with will change as new locations are added, deleted or modified within such networks; and/or (2) the rules governing the flow of data to and from such locations will change.

The proper assignment of RDs and RTs is addressed in companion U.S. patent application Ser. No. 10/252,796, the disclosure of which is mostly repeated herein or incorporated herein by reference.

In the discussion just concluded we focused on MPLS-based techniques for routing data from one VPN to another. As stated earlier, there exists a second technique, the VR approach. We now turn our attention to that technique.

The VR technique involves the generation and use of a number of logical routers (i.e., software, firmware configured to carry out the functions and features of one or more physical routers . . . this technique is sometimes called "emulating" a physical router . . . ). Each logical router is adapted to exhibit the behavioral characteristics of separate physical routers. These logical routers are aptly referred to as virtual routers ("VRs"). In an IP-based VPN, each VPN is assigned a VR within each PE router. The VRs can be connected to each other via a core network and a number of layer 2/layer 3 technologies, such as ATM virtual connections, frame relay connections, LP encapsulation and Layer 2 Tunnel Protocol.

Sometimes an SP's customer places restrictions on locations in its network (e.g., not all locations are allowed to communicate with each other directly). Because of this, a VR must be able to "filter" packets. That is to say, a VR must be able to, for example, determine whether to forward or discard a packet. The filtering capabilities of VRs are specific to the configuration of each VPN. Most VRs filter packets using at least the fields containing the IP source address, LP destination address, source and destination ports, protocol type and the type of service ("TOS") byte embedded within each packet.

More specifically, each VR is linked or otherwise has access to, one or more "access list(s)". These lists contain the exact instructions on how a VR should treat a received packet.

An access list usually comprises a number of entries or "statements", each of which defines whether a particular packet will be forwarded or dropped based on whether the particular packet satisfies certain criteria. For example, an access list can specify that only packets with particular destination addresses are forwarded, while all others are discarded.

Access lists are assigned to a particular pathway (i.e., a particular interface which connects a PE and CE router) in a particular order. In general, for an incoming packet a VR is adapted to match the data packet with criteria specified in a first entry of a first access list. If a match is found, an action specified in the entry will be executed. If a match is not found, the VR is adapted to proceed to the next entry in the access list until a match is found or until the end of the list is reached.

There are two access lists, one transmission and one reception, associated with each pathway. These access lists are stored in PE routers. These two access lists are referred to as "master access lists" or "master lists". Each master list, in turn, comprises a number of sub-access lists. When a new VPN or VPN component is added or deleted, a sub-access list has to be added or deleted from a master access list. In addition, when changes are made to an existing VPN or VPN component (e.g., modifying or removing a location), entries in the corresponding sub-access access lists have to be changed manually. This is labor intensive and leads to many mistakes.

The automatic generation and assignment of correct VR access lists is also addressed in companion U.S. patent application Ser. No. 10/252,796 much of which is also repeated herein or incorporated herein by reference.

In an actual IP-VPN it is possible, and even likely that within an SP's network both MPLS-based and VR-based routers exist. It is also likely that a customer may desire for an SP to deliver communication services between MPLS and VR-based routers. However, current techniques are cumbersome and, in many ways, inefficient for doing so. Therefore, it is desirable to provide techniques for providing interoperability between VR and MPLS-based routers.

Further it is desirable to provide techniques for converting data in MPLS-based protocols to data-based on VR-based protocols and vice-versa.

BRIEF DESCRIPTION OF THE DRAWINGS

FIG. 5 depicts an example of a connectivity matrix generated according to one embodiment of the present invention.

FIG. 7 depicts an example of a second connectivity matrix generated according to one embodiment of the present invention.

FIG. 10 depicts a simplified table illustrating the conversion of VR-based routing data to MPLS-based routing data according to embodiments of the present invention.

FIG. 11 depicts a simplified table illustrating the conversion of MPLS-based routing data to VR-based routing data according to embodiments of the present invention.

SUMMARY OF THE INVENTION

In accordance with the present invention, a conversion section is adapted to generate routing data (e.g., instructions) in a first protocol (MPLS or VR) from routing data based on a second protocol (VR or MPLS).

DETAILED DESCRIPTION OF THE INVENTION

As envisioned by the present inventors, one embodiment of the present invention comprises a network controller which is adapted to first identify basic components of a VPN and then to generate routing data for each of the identified components.

In addition, the present invention envisions one or more routers, such as PE routers, each of which is adapted to route communication traffic based on the generated routing data received from the network controller.

The present invention envisions a number of ways to identify basic components of a VPN. To simplify the explanation which follows, a technique such as the one described in U.S. patent application Ser. No. 10/252,796 may be used. It should be understood, however, that other techniques may be used as well.

The discussion which follows will first concentrate on the identification of these basic components. Thereafter, two techniques for providing interoperability (e.g., by converting routing data) will be discussed. The first technique being an MPLS to VR-based technique; the second being a VR to MPLS-based technique.

Figure 1:
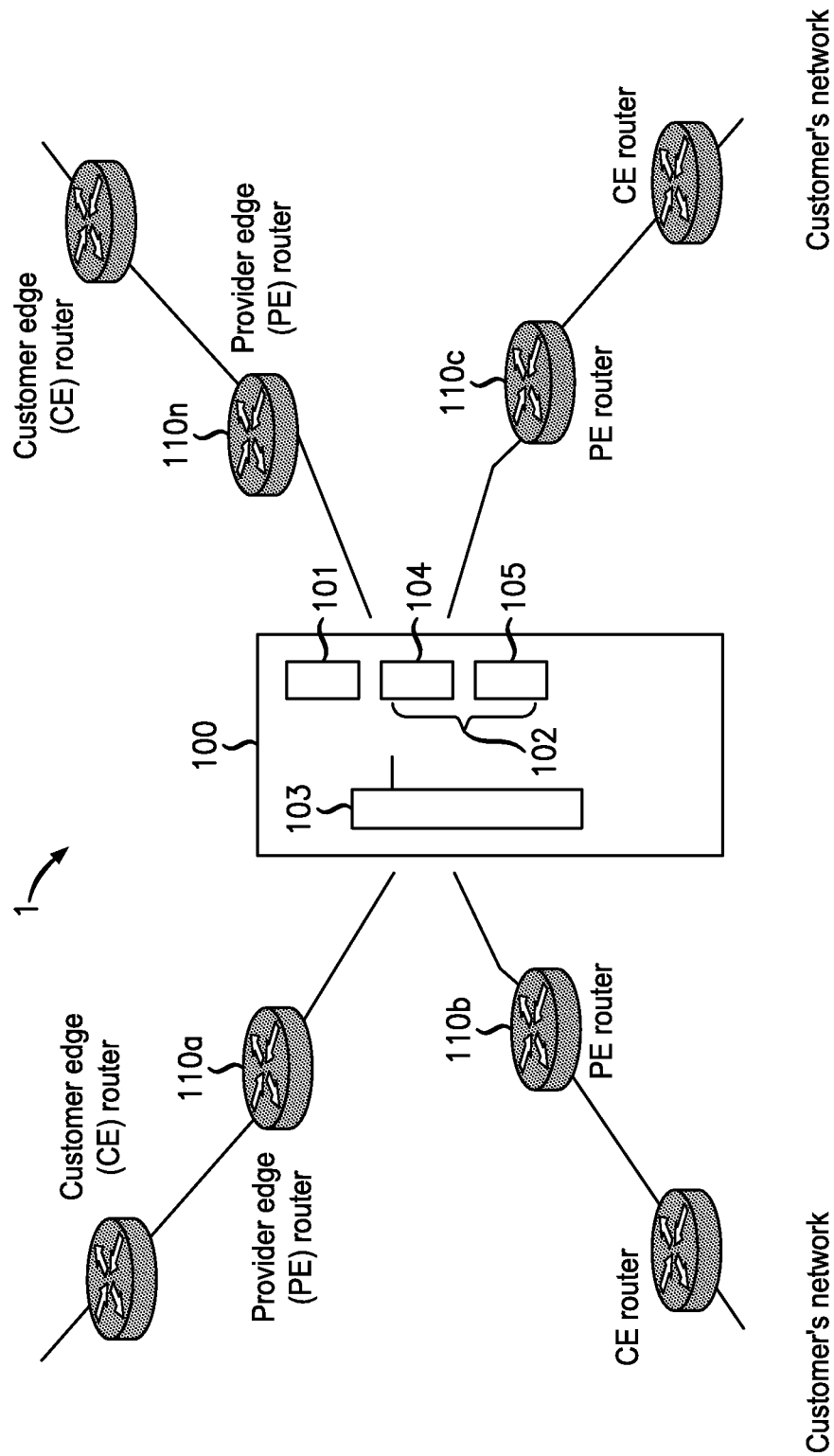
FIG. 1 depicts a simplified block diagram of a network used to illustrate features of the present invention.

Referring now to FIG. 1, there is shown a simplified block diagram of a network 1. As shown, the network 1 comprises a controller 100 and one or more PE routers $110a$, $110b$ ... $110_n$ (where "$_n$" represents the last PE router making up a network).

In one embodiment of the present invention, the network controller 100 comprises an identification section 101 and a data routing generator 102. The identification section 101 is adapted to identify the basic components of all of the VPNs which are a part of network 1. Routing generator 102 is adapted to generate routing data (e.g., routing instructions) for each of the components identified by section 101.

Once the routing generator 102 has generated the appropriate data, it is sent to the appropriate PE router(s) $110_a$, $110_b$ ... $110_n$. In an additional embodiment of the present invention, the controller 100 comprises an interface section 103 which is adapted to transfer the generated data to one or more of the PE routers $110_a$, $110_b$, ... $110_n$.

It should be understood that the basic components identified by the identification section 101 can take on a variety of different configurations. Typically, an SP (e.g., telephone company) which is operating network 1 must obtain a description of a customer's VPN. Depending on the customer, some may or may not be capable of providing the SP with the description of their VPNs or the basic components making up their VPNs. In fact, typically a customer is only capable of describing their network in terms of "connectivity" requirements between various locations in the network. For this reason, the present inventors have envisioned a technique which will allow the identification section 101 to identify these basic components. Again, as stated before, this technique is only one of many which may be used.

Before turning to the technique itself, it may be useful to discuss, generally speaking, the different types of components which typically make up a VPN. The first component is a "full mesh" component. It is the most common and basic type of component in a VPN. A full mesh component can be generated (i.e., created) by grouping together locations belonging to a particular VPN component that are permitted to send and receive packets to, and from, one another.

There are two other types of basic components. One is called a "root-receiver" component (root-receiver for short) and the other is called a "root-transmitter" component (root-transmitter for short). When many locations are logically connected to one common location, the common location is called a "root". Both root-transmitter and root-receiver components have a tree-like topology where a location acts as the "root" of the tree and a number of locations act as the "leaves" of the tree. In a root-receiver VPN component, all of the leaves are allowed to transmit to a root. However, a root cannot transmit to the leaves.

Figure 2:
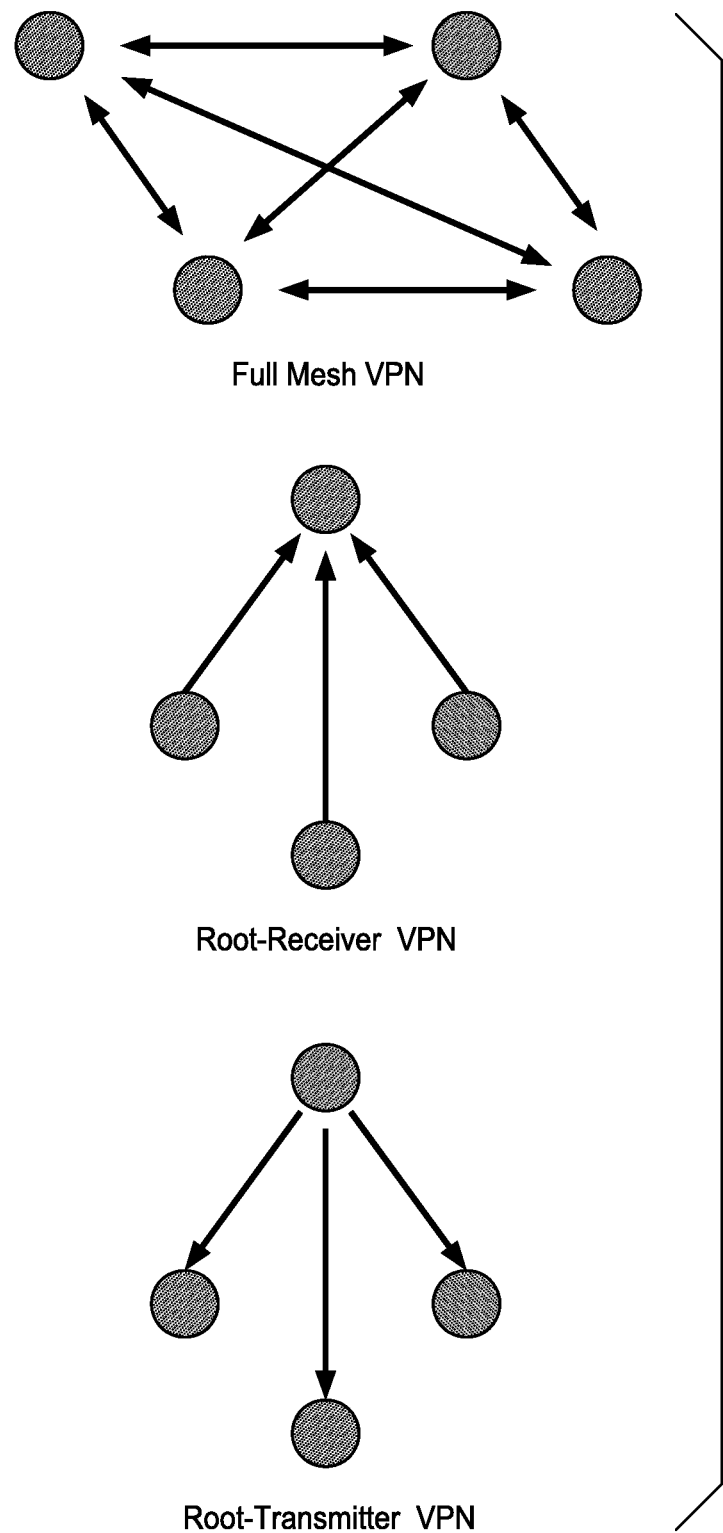
FIG. 2 depicts three basic types of components making up a VPN.

A root-transmitter is substantially the opposite of a root-receiver. That is, a root-transmitter is identified by the fact that the root is allowed to transmit to a number of leaf locations but the leaves cannot transmit to the root. Each of the three basic types of components are shown in FIG. 2.

Figure 3:
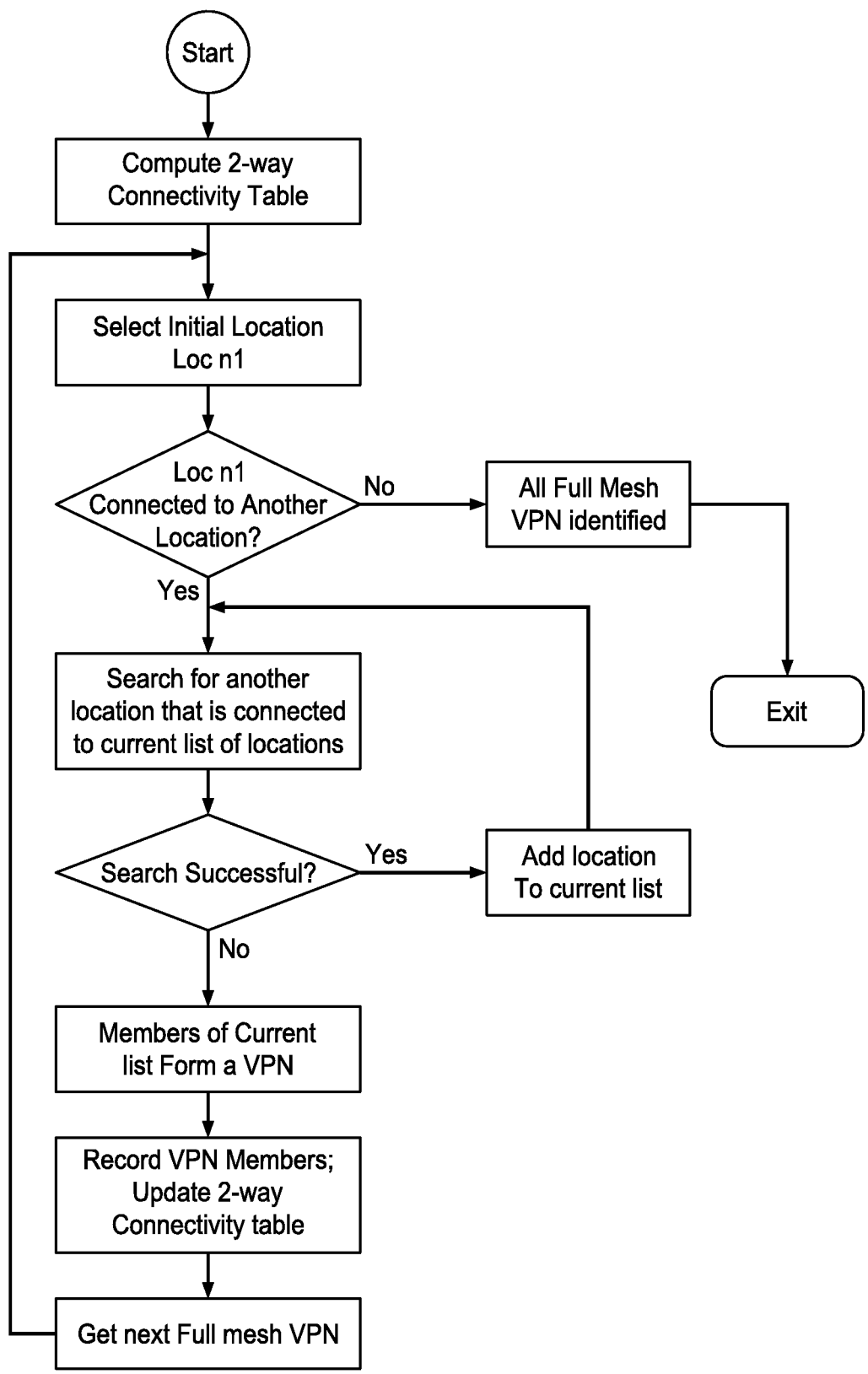
FIG. 3 depicts a simplified flow diagram of a technique for identifying full mesh components of a VPN according to one embodiment of the present invention.

Referring now to FIG. 3, there is shown a simplified flow diagram of one technique for identifying all full mesh components of VPNs in a given network, some of which will be discussed below.

Figure 4:
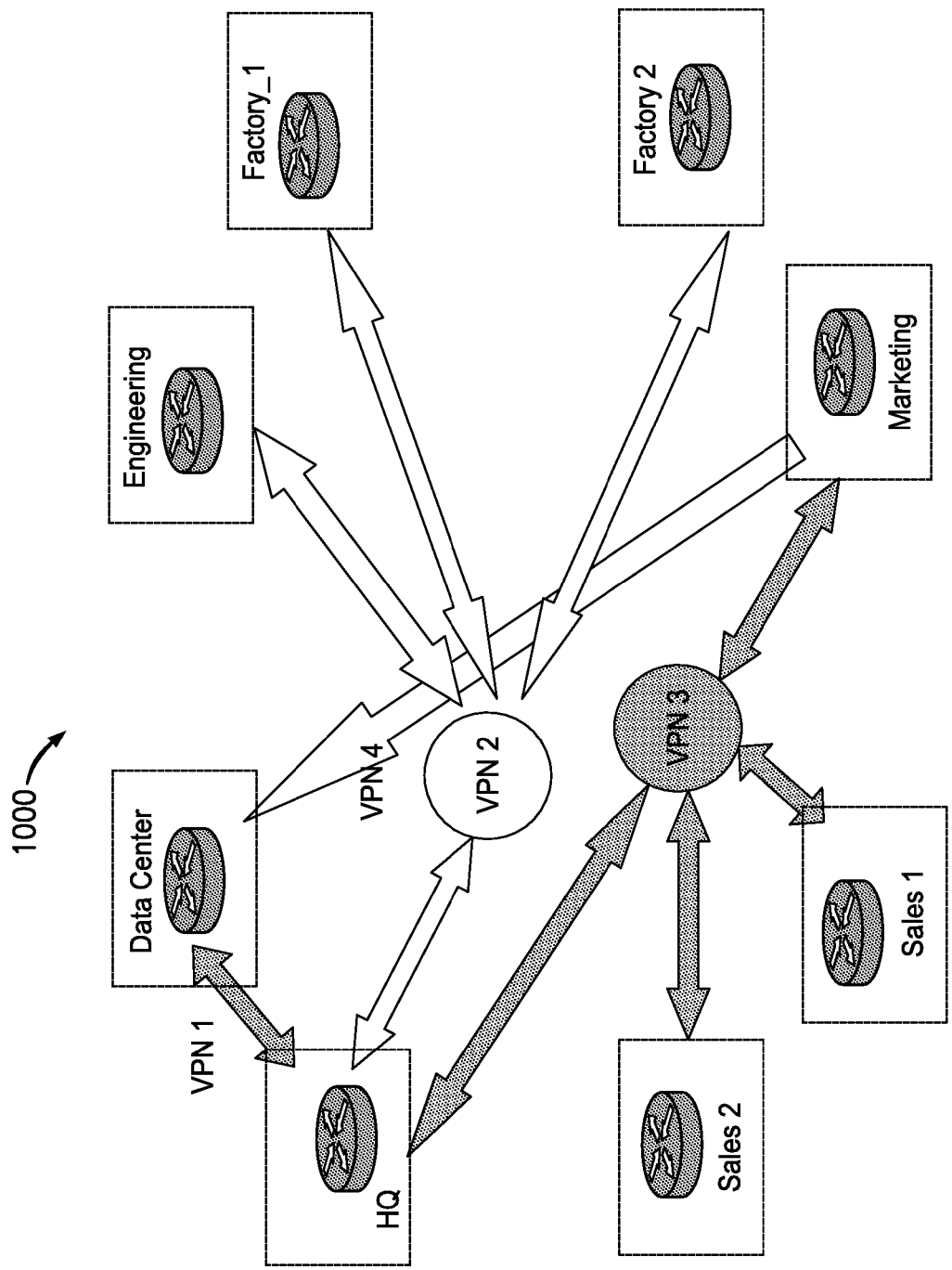
FIG. 4 depicts an example of a network of VPNs.

In one embodiment of the present invention, the identification section 101 is adapted to generate a first connectivity matrix based on two-way communication paths associated with some or all of the locations in one or more VPNs. One example of a network 1000 of VPNs is shown in FIG. 4 while its associated connectivity matrix is shown in FIG. 5. In one embodiment of the present invention, each row and column in the connectivity matrix shown in FIG. 5 represents a location in network 1000. As will be recognized by those skilled in the art, this first connectivity matrix is symmetrical because each connection is a bi-directional connection. In addition, any location in the network 1000 can send to itself thereby making the main diagonal of the matrix equal to "1". It should be understood that the terms "bi-directional connection" and "full mesh component" are used to describe the same set of circumstances in a given network. In an illustrative embodiment of the present invention, section 101 is adapted to construct the first connectivity matrix so that the identification section 101 can identify all maximal, full mesh components associated with VPNs within network 1000 from the first matrix.

Before going further, it should be noted that although the identification section 101, routing generator 102 and interface section 103 are shown as separate sections within controller 100, it should be understood that these sections may be combined into fewer sections or further broken down into additional sections. Also, each "section" may, in fact, comprise one or more software or firmware programs adapted to carry out the features and functions of the present invention. That is not to say that the sections making up the controller 100 shown in FIG. 1 must be realized completely in software or firmware. Rather, the sections shown in FIG. 1 may be realized in a combination of hardware, software, firmware or the like.

Figure 6:
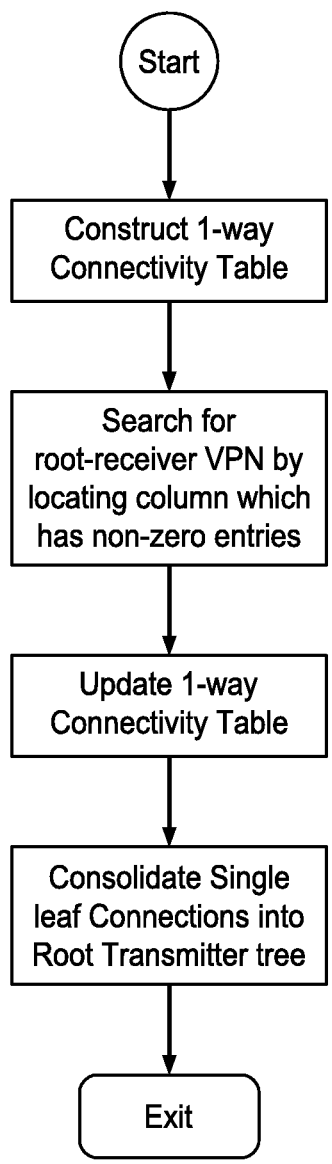
FIG. 6 depicts a simplified, iterative flow diagram of a technique to identify root-receiver and root-transmitter components of a VPN according to one embodiment of the present invention.

Full mesh components are only one type of basic component. In one embodiment of the invention, after the identification unit 101 has identified all of the full mesh components it is further adapted to identify all root-receiver and root-transmitter components. Root-receiver and root-transmitter components are extracted from one-way connections associated with the VPNs shown in FIG. 4 (not two-way, as is the case for full mesh components). FIG. 6 depicts a simplified, iterative flow diagram of a technique which may be used to identify root-receiver and root-transmitter components according to one embodiment of the present invention.

Initially, the identification section 101 is adapted to identify all one-way transmission connections from the VPNs/locations shown in FIG. 4 and then to generate a second connectivity matrix. An example of such a matrix is shown in FIG. 7. The root-receiver and root-transmitter VPNs are extracted from the one-way connections represented by this second matrix according to the rules which follow.

As noted above earlier, the technique just outlined for identifying all of the basic components of the VPNs within a network is one of many that can be used. In an alternative embodiment of the present invention, the identification section 101 is adapted to identify the root-transmitter components first and then the root-receiver components. Further, section 101 can be adapted to identify any full mesh component that has only two members ( . . . identified using the first matrix . . . ) which share a common location and to convert or combine such components into a pair of one way connections (i.e., a root-receiver and/or a root transmitter component) according to a set of rules:

a. First, identify all the two-member full-mesh VPN components that share a common member (or location);

b. convert the above group into a single root-transmitter and a root receiver VPN component with the common member (or location) as the root; and c. repeat the two steps immediately above, until all two-member, full-mesh VPN components having common members are identified.

As will be apparent to those skilled in the art, the initial steps in the technique described above amount to a systematic method for identifying the basic components of a network. Deciding which technique is the "best" technique, depends on many factors, such as the evolution of the network. It should be understood that, the greater the detail and accuracy of the information supplied to an SP by a customer concerning its VPN(s), the better the results will be using the identification technique described above.

After the basic components of a network have been identified, the present invention envisions that the data routing generator 102 shown in FIG. 1 is adapted to generate routing data based on the components identified and their relationships to one another. Routing generator 102 is adaptable to generate routing data for both MPLS and VR based-VPNs.

Figure 8:
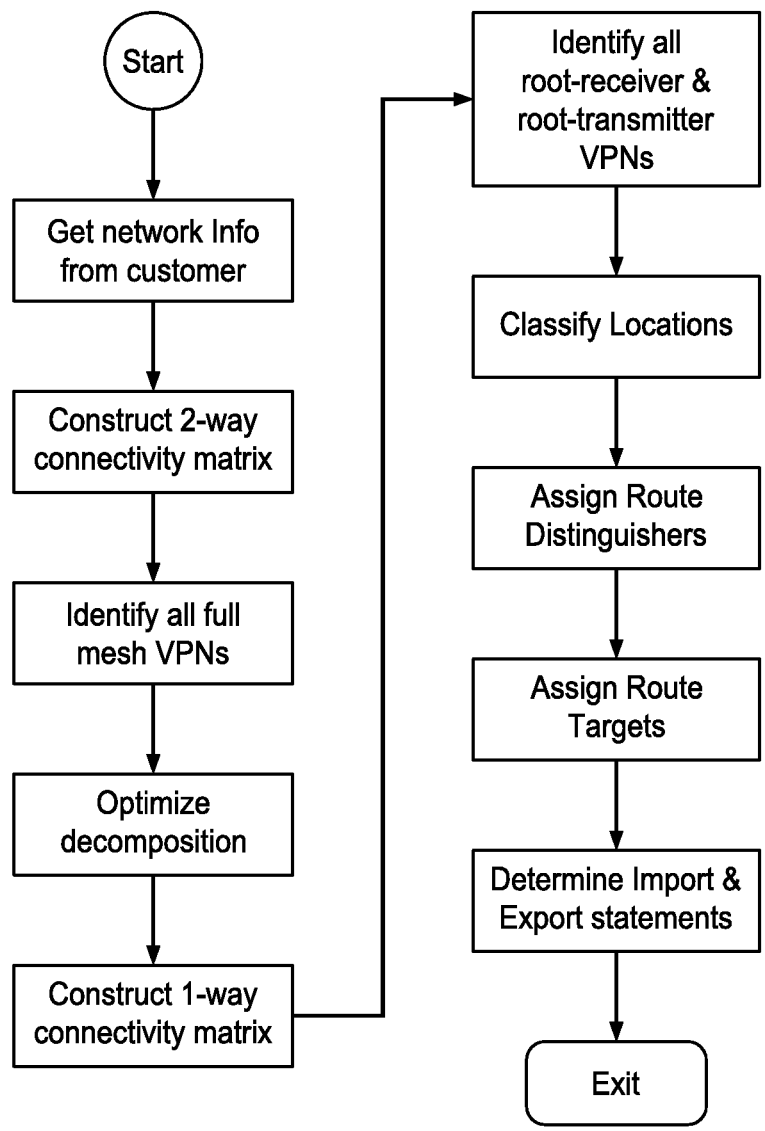
FIG. 8 depicts a simplified flow diagram of a technique for identifying basic components of an MPLS-based VPN and the generation and assignment of RDs and RTs according embodiments of the present invention.

We will discuss MPLS-based VPNs first. FIG. 8 depicts a simplified flow diagram of a technique for identifying the basic components of an MPLS-based VPN as well as the generation and assignment of RDs and RTs for an MPLS-based VPN according to one embodiment of the invention.

In one embodiment of the present invention, the routing generator 102 shown in FIG. 1 comprises an RD assignment section 104 adapted to generate and assign RDs to network components identified by the identification section 101 and an RT assignment section 105 adapted to generate and assign RTs.

An RD is a value or a "tag" so to speak that is assigned to each PE router $110_a$, $110_b$ ... $110_n$, by the controller 100 via section 103. Upon receiving an RD and RTs, a router $110_a$, $110_b$ ... $110_n$, is adapted to generate VRF. Generally, an RD value contains two fields: a field that identifies the SP and a field that identifies the RD in the SP's network. In one embodiment of the invention, the RD assignment section 104 is adapted to assign one RD to all locations that are members of the same, identified full-mesh VPN component. In addition, the section 104 is adapted to assign a single, unique RD to each location which is part of a root-receiver or root transmitter, identified component.

As mentioned above, an RT assignment section 105 is adapted to assign RTs. In one embodiment of the present invention, section 105 is adapted to assign RTs as follows:

Each full mesh VPN component is assigned its own RT. This allows each member of a full mesh VPN component to "export" and "import" the assigned RT;

Each root transmitter VPN component is assigned its own RT. This allows each branch of a VPN component to export the RT, and the root of the VPN component to import the RT; and Each root receiver VPN component is assigned its own RT. This allows each branch of a VPN component with to import the RT, and the root of the VPN to export the RT.

The terms "import" and "export" are described in RFC 2547. In general, if a location wants to receive packets associated with a particular VPN component, it would export the RT associated with the particular VPN by "advertising" the RT via a routing protocol. If a location is authorized to transmit data associated with a particular VPN component, it would import a route advertisement, with a matching RT, into its VRF table.

Backtracking somewhat, in another embodiment of the invention, the identification section 101 can be adapted to identify all root-transmitter and root-receiver VPN components that have the same branches. Two root-transmitter (or two root-receiver) VPN components that have the same branches are referred to as being "equivalent". It can be said that the section 101 can be further adapted to associate components having the same branches to an equivalent root-transmitter or root-receiver component (which ever applies).

Consistent with such an embodiment the route generator 102 can be adapted to assign the same RT to an equivalent root transmitter (or root receiver) VPN component and to assign the same RD to the roots of equivalent root transmitter (or root-receiver) VPN components so as long as all of the roots belong to the same full mesh VPN component.

In one embodiment of the invention, the network interface section 103 shown in FIG. 1 is adapted to transfer the assigned RDs and RTs (i.e., routing data) to the one or more routers $110_a$, $110_b$ ... $110_n$, using a Simple Network Management Protocol ("SNMP") or similar protocol. The routers $110_a$, $110_b$ ... $110_n$, are then adapted to construct VRF tables based on the transferred RDs, RTs and BGP-MP route advertisements as specified in RFC 2547. Once the VRF tables are constructed, the routers $110_a$, $110_b$ ... $110_n$ are adapted to route communications traffic using the so-constructed tables.

As the configuration of network 1000 changes and new basic components are formed, the RD and RT assignments must, for the most part, change as well. In one embodiment of the invention, the controller 100, via section 103 is adapted to repeatedly transfer updated routing data (e.g., RDs and RTs) to the routers $110_a$, $110_b$ ... $110_n$ The routing generator 102 is also adapted to generate routing instructions for VR-based VPNs. In a VR-based IP-VPN, each VPN is assigned a single VR within a PE router. It should be understood that each PE router may comprise a number of VRs, one for each VPN. It should be further understood that if a customer of an SP has more than one VPN, each VPN is assigned its own VR.

VR-based VPNs do not use RDs and RTs. Instead, "access lists" are used to control the flow of traffic. These access lists are generated by the generator 102 and transferred to routers $110_a$, $110_b$ ... $110_n$, via section 103 so that each VR in a PE router can control the routing of communications traffic.

As mentioned above earlier, associated with each pathway between a customer location and a VR are two access lists, one for transmitting traffic to, and one for receiving traffic from, a network.

In one embodiment of the invention, the generator 102 is adapted to generate and transfer to each router $110_a$, $110_b$ ... $110_n$, two master access lists for each such pathway (so-called "RECEIVE" and "SEND" lists discussed below). Further, each of the master access lists comprises a number of sub-access lists each sub-access list being associated with a single VPN component.

In one embodiment of the invention, when an incoming packet arrives at a router, the router is adapted to forward the packet to a first VR (i.e., within the PE). Thereafter, the VR is adapted to compare the incoming packet with criteria specified in the first entry of the first access list. If there is a match, the router is adapted to execute or otherwise carry out the actions as specified in the entry. If not, the VR is adapted to proceed to the next entry in the first access list until a match is found or the last access list is exhausted. Thereafter, the incoming packet is discarded and the next incoming packet undergoes a similar comparison process.

The operation of the routing generator 102 in a VR-based VPN mode will now be discussed in more detail. According to one embodiment of the present invention, the routing generator 102 is adapted to generate a RECEIVE and a SEND master access list of Internet protocol addresses based on VPN components identified by the identification section 101 for each network pathway. The routing generator 102 is further adapted to reduce the size of the access lists by substantially summarizing the Internet addresses. Address summarization involves combining two or more IP address "subnets" into a single larger IP address subnet. In addition, the generator 102 is adapted to generate revised, master access lists each time a location (or VPN component) is modified, added to, or deleted from, a VPN (or network).

To generate the master access lists, the generator 102 is further adapted to generate secondary RECEIVE and SEND access lists, one for each VPN component identified by the identification section 101. It should be understood that although the master access lists have been discussed first, in reality the generator 102 is adapted to generate the secondary access lists first and then combined these lists to form the master access lists. The VPN components may be full-mesh, root-receiver or root-transmitter components. As with the master access lists described above, the generator 102 is further adapted to generate revised secondary lists each time a location (or VPN component) is modified, added to, or deleted from a VPN component (or network).

It should be understood that, after the generator 102 has generated the lists, the network interface section 103 is adapted to transfer the master/secondary RECEIVE and SEND lists to one or more routers 110$_a$, 110$_b$ ... 110$_n$, in the network. The routers are then adapted to route communication traffic based on the transferred RECEIVE and SEND access lists.

It should be noted that different customer locations connected to a VR may have the same access list. In particular, locations that, in RFC 2547 terminology, export and import the same RTs, would have the same access lists. Taking this into account, it is possible to generate a reduced number of access lists.

Figure 9A:
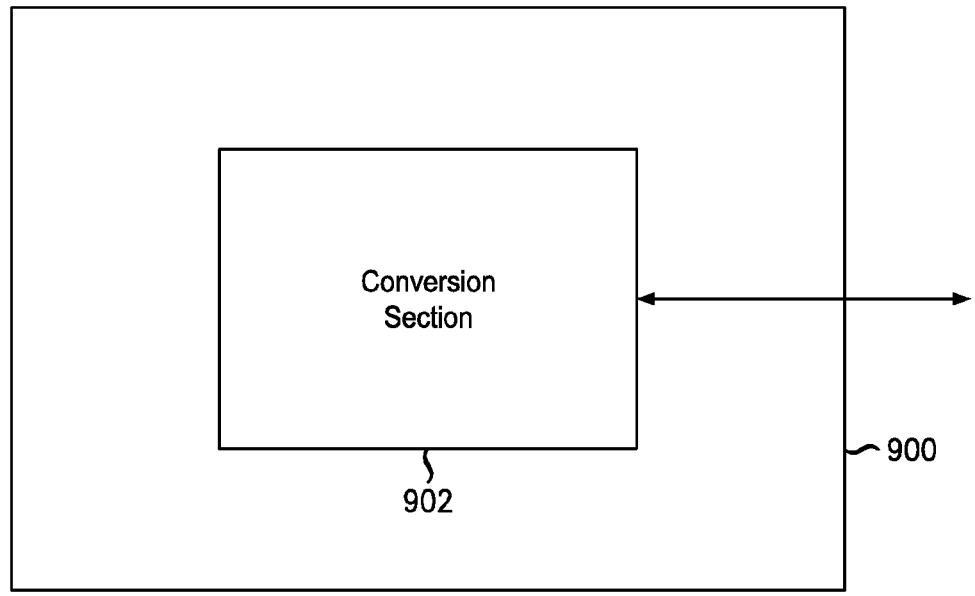
FIG. 9A depicts a simplified block diagram of a device for converting routing data from MPLS-based data to VR-based data and vice-versa according to one embodiment of the present invention.

Once routing data is generated it is passed or routed from one router to another. Because many networks may have, or may desire to have, both MPLS and VR-based routers, there is a need to ensure that these routers can route data between them effectively. FIG. 9A is a simplified block diagram of a device 900 for converting routing data from a first protocol to a second protocol and vice-versa (e.g., from MPLS-based data to VR-based data) according to embodiments of the present invention (it being understood that "first" may refer to either protocol and "second" may refer to either protocol). In one embodiment, the system 900 comprises conversion section 902 adapted to generate new routing data comprising a next set of parameters based on parameters contained within routing data of another protocol. In one embodiment, the new routing data is MPLS-based routing data; in another embodiment the new routing data is VR-based routing data.

The conversion section 902 may comprise one or more platforms (e.g., hardware, software, firmware or any combination of these elements) adapted to implement the various features and functions of the present invention described above and below.

In another embodiment of the present invention, the conversion section 902 comprises a "route reflector". A route reflector comprises a logical module, or plurality of modules, that is connected to a VPN and is adapted to serve as a concentration point for edge routers. In one embodiment, the route reflector may be implemented in a designated router. A route reflector is operable to receive messages from client components that it serves and is adapted to forward the messages throughout the VPN. Conversely, the route reflector is further adapted to receive messages from the rest of the VPN and forward them to the appropriate client component.

Figure 9B:
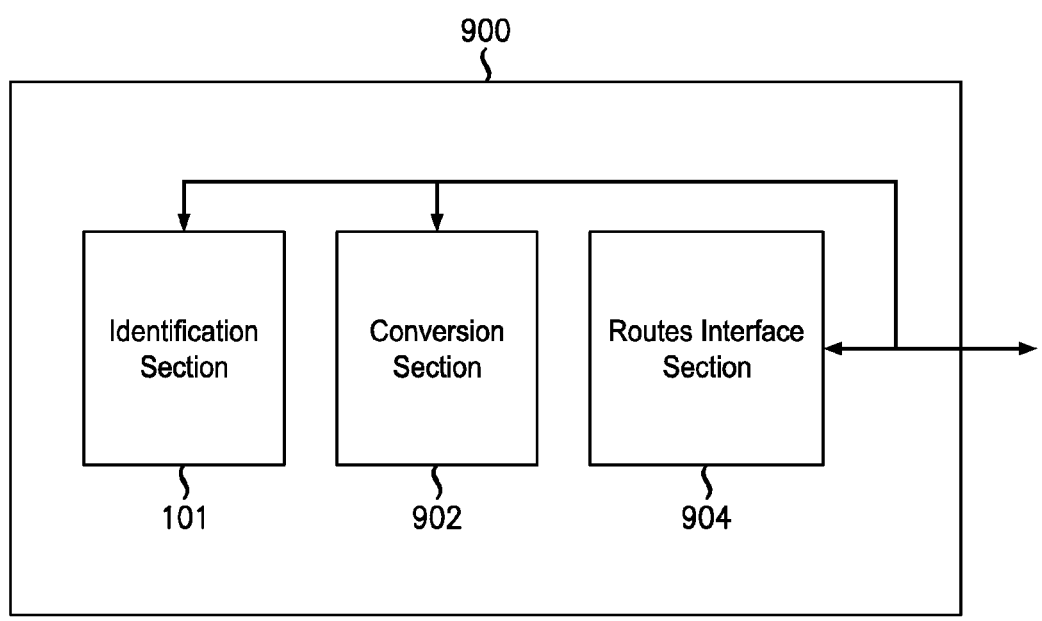
FIG. 9B depicts another simplified block diagram of a device for converting routing data from MPLS-based data to VR-based data and vice-versa according to another embodiment of the present invention.

FIG. 9B is a simplified block diagram illustrative of yet another embodiment of the present invention wherein, the system 900 may comprise an identification section, like section 101, adapted to identify basic components of the network as described above. After the identification section 101 has identified the basic components of the network and the conversion section 902 has generated the appropriate routing data, a router interface section 904 can be adapted to transmit the generated routing data to at least one of the identified VPN components.

We now turn to a more detailed description of the operation of the conversion section 902. First, we will describe the operation of a system where VR-based routing data is converted to MPLS-based routing data. Then, we will describe the operation of a system where MPLS-based routing data is converted to VR-based routing data.

In one embodiment of the present invention, VR routing data comprises a combination of data selected from a PE router IP address, a customer site ID, a VR ID, a customer location subnet address and an additional IP subnet address. FIG. 10 depicts a simplified diagram illustrating a technique for generating MPLS routing data from VR routing data. As shown, the conversion section 902 is adapted to generate an MPLS-based NEXT HOP parameter based on a PE router IP address parameter, an MPLS label parameter based on a customer site ID parameter, an MPLS-based NLRI parameter based on a customer location IP subnet address parameter, and an MPLS-based RT parameter based on a VR ID parameter. The RD parameter maybe input manually by the user for each customer site.

In an alternative embodiment of the present invention, MPLS-based routing data comprises a combination of data selected from a NEXT HOP parameter, an NLRI field, an RT and an RD.

FIG. 11 depicts a simplified diagram illustrating a technique for generating VR-based routing data from MPLS-based data. In an embodiment of the present invention, the conversion section 902 is yet further adapted to generate a VR protocol PE router IP address parameter based on an MPLS-based NEXT HOP parameter, a VR protocol customer site ID parameter based on an MPLS label, a VR ID parameter based on an RT lookup table, a VPN ID based on an RT lookup table and a customer location local IP subnet address based on an NLRI field. Additional IP subnets address are obtained from VPN-specific processing. In an alternative embodiment, the VR ID parameter and the VPN customer ID may be obtained by decomposing an RT field into VR and VPN customer subfields rather than by accessing a lookup table.

The examples given above have sought to illustrate the conversion of routing data from MPLS-based data to VR-based data and vice-versa. Alternate embodiments will become apparent to those skilled in the art to which the present invention pertains without departing from its spirit and scope as defined by the claims which follow:

We claim:

1. A system for converting data in an Internet protocol based virtual private network (VPN), comprising:
   a conversion section adapted to generate data based on a first VPN forwarding protocol, where the first VPN forwarding protocol is a Multi-Protocol Label Switching (MPLS)-based protocol that comprises MPLS-based data or a Virtual Router (VR)-based protocol that comprises VR-based data from data based on a second VPN forwarding protocol, where the second VPN forwarding protocol is a VR-based protocol or a MPLS-based protocol, respectively,
   wherein VR-based data comprises a provider edge (PE) router Internet Protocol (IP) address, a customer site Identification (ID), a VR ID, a VPN customer ID, a local subnet address, a customer location subnet address, and an additional IP subnet address and MPLS-based data comprises a NEXT HOP parameter, a Network Layer Reachability Information (NLRI) field, a route target (RT) and a route distinguisher, and
   wherein the conversion section is adapted to:
   generate an MPLS-based NEXT HOP parameter based on a PE router IP address parameter, generate an MPLS label parameter based on a customer site ID parameter, generate an MPLS-based NLRI parameter based on a customer location IP subnet address parameter, and generate an MPLS-based RT parameter based on a VR ID parameter, and
   generate a VR protocol PE router IP address parameter based on an MPLS-based NEXT HOP parameter, generate a VR protocol customer site ID parameter based on an MPLS label, generate a VR ID parameter and a VPN ID based on an RT lookup table or by decomposing an RT field into VR and VPN customer subfields, and generate a customer location local IP subnet address based on an NLRI field.

2. The system of claim 1, wherein the conversion section comprises a network controller.

3. The system of claim 1, wherein the conversion section comprises a router.

4. The system of claim 1, wherein the conversion section comprises a route reflector.

5. A method for converting data in an Internet protocol based virtual private VPN using a conversion section, comprising:
   generating data based on a first VPN forwarding protocol, where the first VPN forwarding protocol is a Multi-Protocol Label Switching (MPLS)-based protocol that comprises MPLS-based data or a Virtual Router (VR)-based protocol that comprises VR-based data from data based on a second VPN forwarding protocol, where the second VPN forwarding protocol is a VR-based protocol or a MPLS-based protocol, respectively,
   wherein VR-based data comprises a provider edge (PE) router Internet Protocol (IP) address, a customer site Identification (ID), a VR ID, a VPN customer ID, a local subnet address, a customer location subnet address, and an additional IP subnet address and MPLS-based data comprises a NEXT HOP parameter, a Network Layer Reachability Information (NLRI) field, a route target (RT) and a route distinguisher, and
   wherein generating data based on the first VPN forwarding protocol comprises:
   generating an MPLS-based NEXT HOP parameter based on a PE router IP address parameter, generating an MPLS label parameter based on a customer site ID parameter, generating an MPLS-based NLRI parameter based on a customer location IP subnet address parameter, and generating an MPLS-based RT parameter based on a VR ID parameter, and
   generating a VR protocol PE router IP address parameter based on an MPLS-based NEXT HOP parameter, generating a VR protocol customer site ID parameter based on an MPLS label, generating a VR ID parameter and a VPN ID based on an RT lookup table or by decomposing an RT field into VR and VPN customer subfields, and generating a customer location local IP subnet address based on an NLRI field.

* * * * *